H. THOMAS.
Chucks for Rock-Drills.
No. 168,938. Patented Oct. 19, 1875.
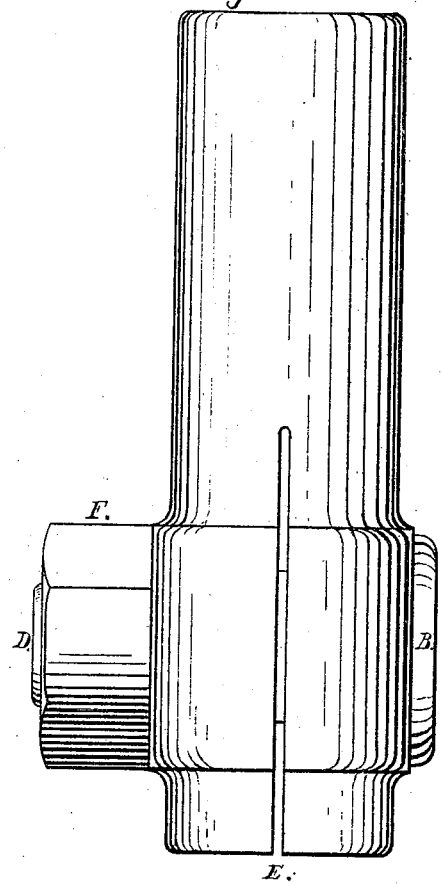
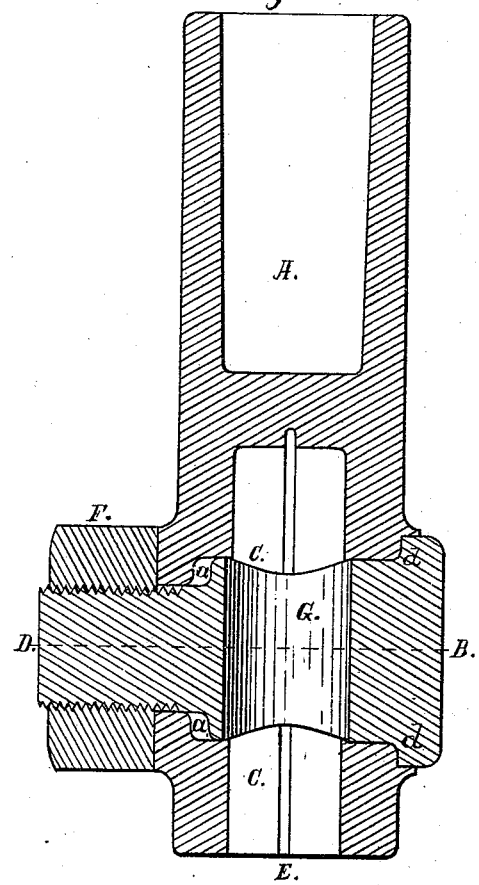
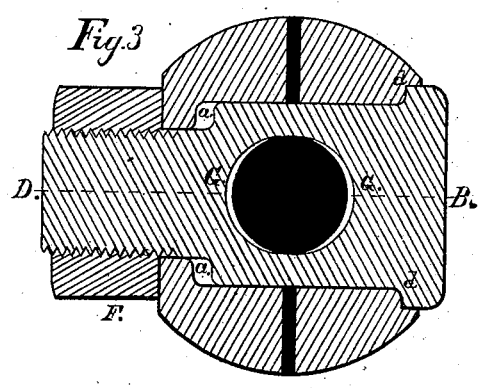
Witnesses;
William McFaul
G. B. Leddon
Inventor;
Hugh Thomas

UNITED STATES PATENT OFFICE.

HUGH THOMAS, OF NEW YORK, N. Y.

IMPROVEMENT IN CHUCKS FOR ROCK-DRILLS.

Specification forming part of Letters Patent No. 168,938, dated October 19, 1875; application filed October 7, 1875.

*To all whom it may concern:*

Be it known that I, HUGH THOMAS, of the city of New York, State of New York, have invented a new and useful Improvement in Rock-Drills, which improvement is fully set forth in the following specification, reference being had to the accompanying drawings.

This improvement relates to improvements in apparatus for drilling holes in rock or other hard substances, in which apparatus pistons carrying a drill are made to reciprocate or revolve by the force of steam, air, or other power.

My invention consists in a novel form and arrangement of the chuck-bolt, in combination with the chuck for securing the drill to the piston, causing it to be firmly held in its place by the tightening of one nut, or removed, when necessary, by loosening one nut.

The accompanying drawings are as follows: Figure 1 is an elevation of the chuck with the chuck-bolt and nut in their places. Fig. 2 is a longitudinal section of the same through the line B D, Fig. 3; and Fig. 3 is a transverse section through the line B D, Fig. 2.

Similar letters of reference indicate corresponding parts in the several figures.

In the annexed drawings, the chuck A has a split cut on each side, as shown at E, the full depth of the hole C, so that the sides of the chuck can be sprung closer together. The chuck also has a chuck-bolt, B D, fitted to it, with a shoulder or projection at *d*, Figs. 2 and 3, bearing against one side of the chuck. The hole in the bolt at G is made an oval shape, to allow the bolt a movement edgewise without touching the drill, which is inserted in the hole C. The bolt is made somewhat shorter than the hole in the chuck, also to allow an end motion of the bolt, as shown at *a*, so that when the two sides of the chuck are forced together about the drill in the hole there will still be a clearance for the bolt, and the sides will not jam on it. Now, when the drill is in the hole, and the nut F screwed up tight, the sides of the chuck are pressed against the drill with corresponding force, and the drill is securely held.

What I claim as my invention, and desire to secure by Letters Patent, is—

1. The chuck-bolt B D, with an oval or elongated hole encircling the drill-shank, and securing the same with one nut, substantially as set forth and described.

2. The combination of the chuck A and the chuck-bolt B D, substantially as and for the purpose described.

HUGH THOMAS.

Witnesses:
WILLIAM MCFAUL,
G. B. LEDDON.